Figure 3:
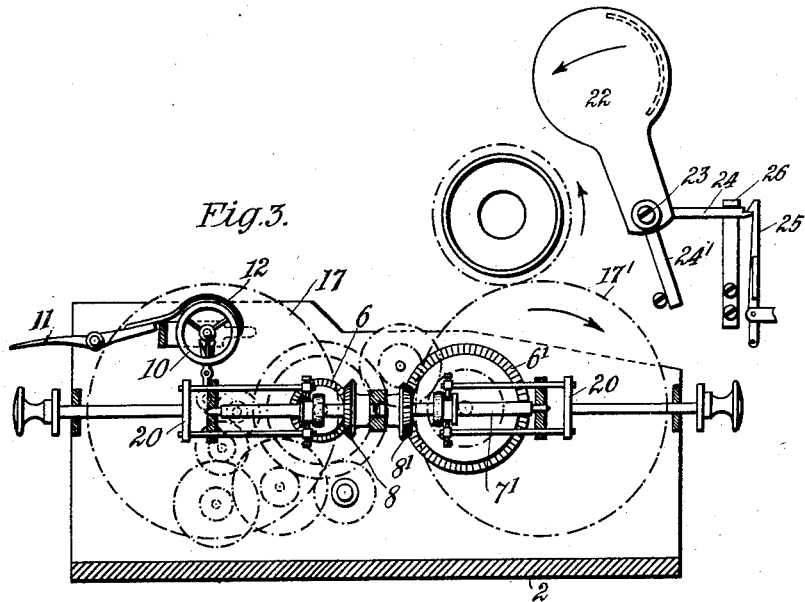

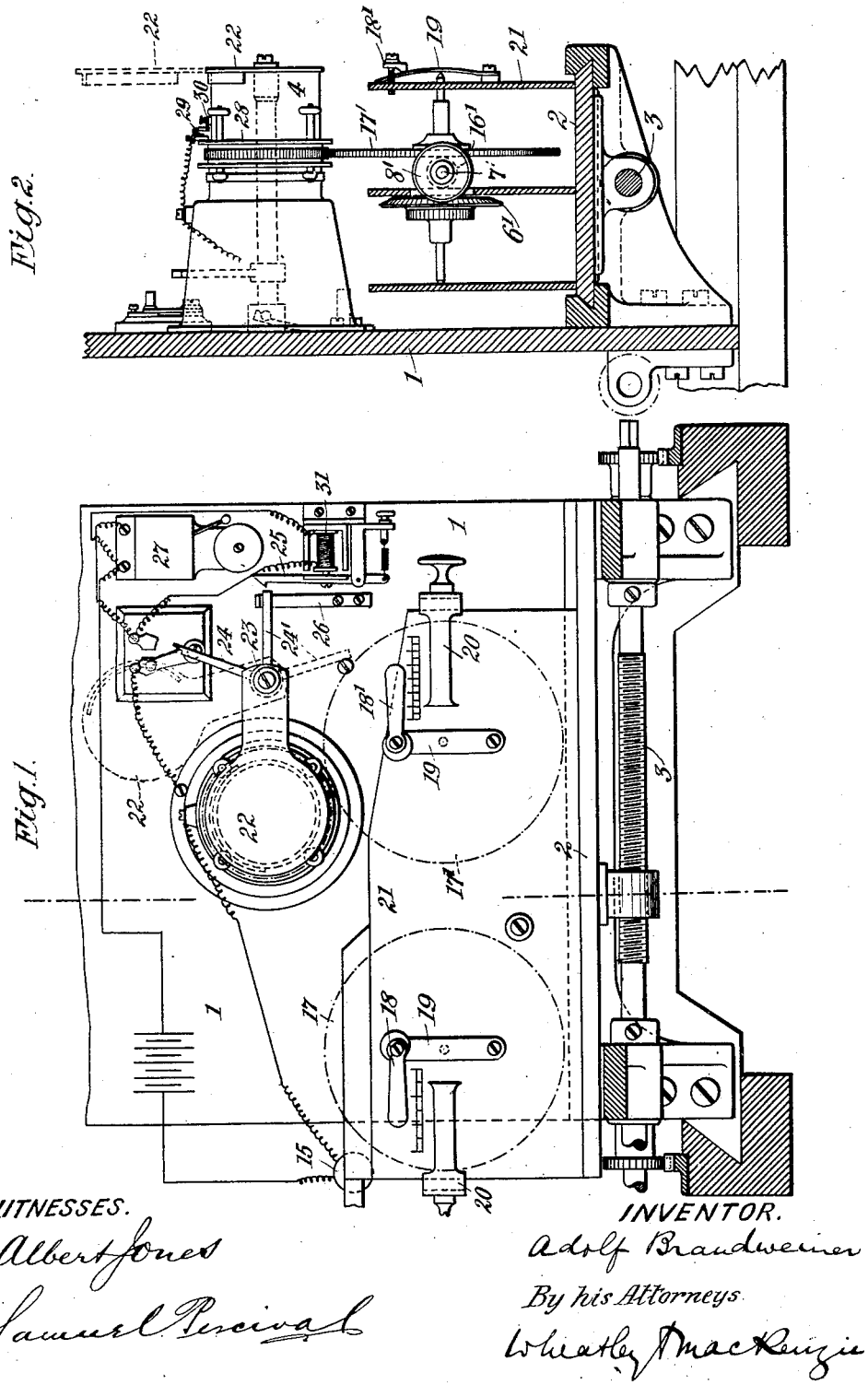

No. 738,654. PATENTED SEPT. 8, 1903.
A. BRANDWEINER.
PHOTOGRAPHIC DIAPHRAGM ADJUSTING MECHANISM.
APPLICATION FILED MAY 26, 1902.
NO MODEL. 4 SHEETS—SHEET 3.

WITNESSES.
Albert Jones
Samuel Percival

INVENTOR.
Adolf Brandweiner
By his Attorneys.
Wheatley & Mackenzie

No. 738,654. Patented September 8, 1903.

UNITED STATES PATENT OFFICE.

ADOLF BRANDWEINER, OF OETZSCH, GERMANY.

PHOTOGRAPHIC-DIAPHRAGM-ADJUSTING MECHANISM.

SPECIFICATION forming part of Letters Patent No. 738,654, dated September 8, 1903.

Application filed May 26, 1902. Serial No. 109,005. (No model.)

*To all whom it may concern:*

Be it known that I, ADOLF BRANDWEINER, a subject of the Emperor of Germany, whose post-office address is 5 Mittelstrasse, Oetzsch, near Leipzig, Germany, have invented certain new and useful Improvements in Photographic-Diaphragm-Adjusting Mechanism; and I do hereby declare the following to be a full, clear, and exact description of the invention, such as will enable others skilled in the art to which it appertains to make and use the same.

Autotype screen photographs, as is known, are produced by placing a screen of any kind immediately before the photographic plate or under another arrangement directly behind the transparent positive or negative and varying the diaphragm-opening a few times during the exposure. The gage of the screen, the distance at which the screen is placed, the greatest effective aperture of the diaphragm, the focal length of the objective, and the size of the picture to be taken—that is, the extent to which the camera is drawn out—must all bear a fixed relation to each other, while after this condition has been fulfilled the chief point in obtaining a certain effect in the screen negative or positive is the times of the exposures, which, again, beyond the conditions already mentioned, depend upon the appearance of the original, the strength of the light, the temperature, the sensitiveness of the plate, &c.

When a picture has been focused, the practice hitherto has been to settle the distance at which the screen is to be placed, whereupon with a small diaphragm-opening exposure is effected until small grains are produced over the whole image. The exposure is now interrupted, a further exposure being made for some time with a larger opening, whereby larger grains corresponding to the light portions of the original result. This procedure may be repeated several times.

The form in which the diaphragm is cut out is a matter of secondary importance. It is also known that besides the sliding diaphragms special iris-stops exist. Hitherto the exposure has been effected for some time with a certain dimension of stop without any alteration being made during the actual exposure. If another dimension were called for, the exposure had to be interrupted. The present invention differs entirely from this procedure, the change in the dimension of the stop being effected during the taking operation itself quite mechanically and continuously until the largest dimension applicable is reached, so that the operation proceeds from the smallest opening at regular intervals, whereupon another dimension, as desired, is proceeded with, the intervals being different, and so on until the largest opening arranged for is reached. By this continuous change in the dimensions of the screen all disadvantages attaching to the processes hitherto employed are obviated and most perfect negatives obtained.

The invention relates to apparatus for adjusting the diaphragms by means of which it is possible to mechanically move the diaphragms up to the largest opening at the time in two or more various times and in two or more dimensions variable in relation to one another, so that, for example, the smaller opening is enlarged to a certain diameter in longer time and gradually enlarged to a certain size in shorter time, or inversely. The maintaining of at least two different rates of speed in the alteration of the opening during the exposure is therefore requisite, as in the first place with a smaller opening less light can reach the sensitive plate, and therefore a longer time is necessary for the formation of the small grains, while in the second case with enlarged opening more light reaches the plate, and consequently a shorter period of exposure is sufficient for the formation of the largest grains.

Figure 4:
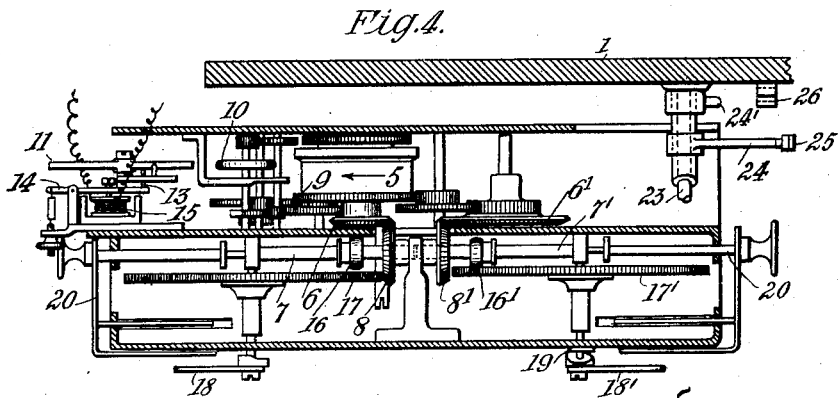
Figure 5:
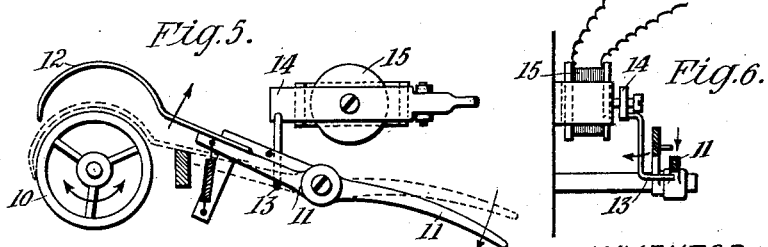
Figure 6:
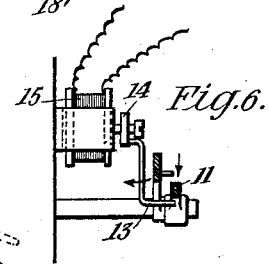
Figure 7:
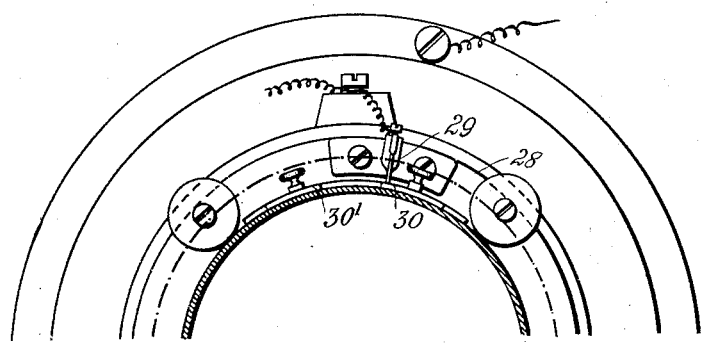
Figure 8:
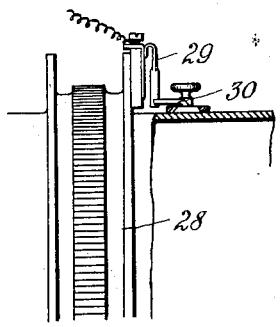
Figure 9:
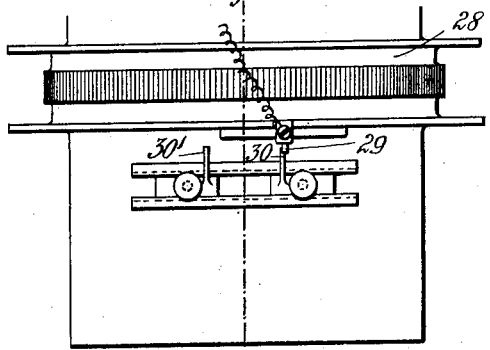
Figure 10:
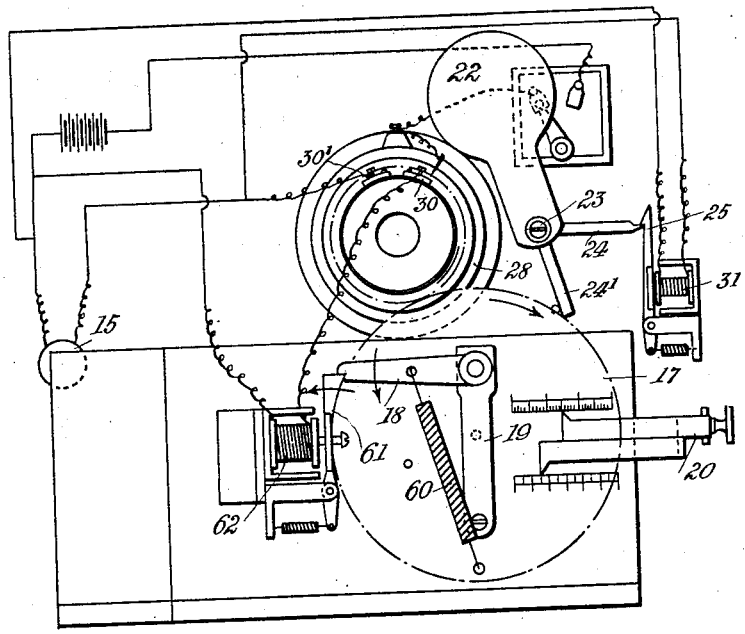
Figure 11:
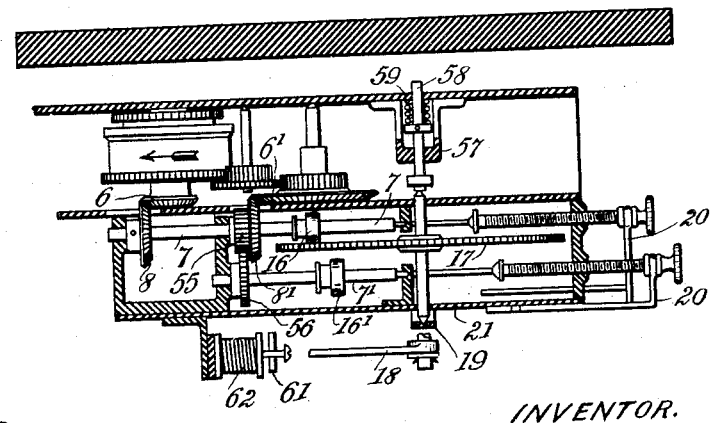

In the accompanying drawings, Figure 1 is a front view of an apparatus which effects the alteration of the opening in two separate periods, Fig. 2 being a transverse section of the same; Fig. 3, a longitudinal section through the actuating mechanism; Fig. 4, a plan of Fig. 3. Figs. 5 and 6 are detailed representations of the starting and stopping apparatus. Figs. 7 to 9 illustrate on a larger scale details of the opening-adjustment ring with current-closing device. Fig. 10 represents the apparatus in the form for the automatic change from one to the other rate of speed in connection with the shutting off; Fig. 11, a plan of Fig. 10.

In the form shown in Figs. 1 to 3 the driving mechanism is arranged on a base-board or carriage in front of the objective 1, this carriage being displaceable transversely to the objective by means of the adjusting-spindle 3. (See Figs. 1 and 2.) The spring-drum 5, which actuates the apparatus, (see Fig. 4,) carries a bevel-wheel 6, which permanently gears with the bevel-wheel 8, attached to the shaft 7. Another pair of bevel-wheels 6' 8' drives the shaft 7', arranged in the extension of the shaft 7, through the medium of a connecting-gear operated from the toothed rim 9. The action of the spring driving mechanism is regulated by an escapement generally known in connection with watches, over the balance 10 of which a spring 12, Fig. 5, bent like a hook and fixed to the lever 11, engages, so that when the spring is raised the balance, which has been previously held, is free to oscillate. In its raised position the spring-lever 11 is retained by the hook 13, which is so attached to the armature 14 of an electromagnet 15 that when the magnet is excited the lever 11 is released and the spring 12 of the lever, lying on the balance 10, effects the stoppage of the actuating mechanism. (See dotted line in Fig. 5.)

On the shafts 7 and 7' friction-rollers 16 16' are placed so as to be longitudinally adjustable. Against these rollers the friction-disks 17 17', the circumferences of which are indented, are intended to be pressed, Fig. 4. For pressing the disks 17 17' levers 18 18', furnished with cams, are employed, these cams bearing against the springs 19, Figs. 2 and 4, which support the step for the shafts of the friction-disks. The displacement of the friction-rollers 16 16' is effected with the aid of the slides 20, Fig. 3, which engage in annular grooves in the slides, the slides being provided with arms passing over the end 21 and furnished with pointers that move over a suitable scale, Fig. 1.

In front of the objective 4 a drop-shutter 22 is pivoted on the pin 23. When the arm 24 catches behind the nose of the hooked lever 25, this drop-shutter is held in the raised position, Fig. 3. A second arm 24', in conjunction with the stop 26, prevents the shutter 22 from falling too far when released. The releasing of the shutter 22, as well as of the spring-lever 11 and the actuating of the alarm apparatus 27, Fig. 1, are effected by the closing of an electric circuit, which is brought about automatically by the striking of the contact-spring 29, attached to the diaphragm-adjustment ring, against the contact-pins 30 and 31, Figs. 7 to 9. In using the automatic diaphragm-adjusting apparatus the carriage 2 is to be pushed with the aid of the adjusting-spindle 3, so that the disk 17 comes into engagement with the toothed rim of the diaphragm-adjusting ring 28, this latter having been previously adjusted for the desired smallest diaphragm-opening. If the spring-lever be now raised, the actuating mechanism is set going, and the hook 13 prevents the lever 11 from immediately falling. In the same manner the shutter 22, which is hereupon directly raised, is held in the raised position by the nose of the hook-lever 25. As a matter of course, before the actuating mechanism is set in motion care must be taken to rightly adjust the friction-rollers 16 16', as the period of exposure at the time is determined by the position of these rollers in relation to the disk 17 17'. Likewise the pressing of the friction-disks 17 17' in engagement at the time with the toothed rim of the diaphragm-opening adjustment-ring 28 must be effected before the actuating mechanism is released, so that with the releasing of this mechanism the adjustment of the diaphragm-opening begins. In connection herewith the adjustment-ring 28 moves at a uniform rate of speed until its contact-spring 29 strikes against the contact-pin 30, Figs. 8 to 9, so that the circuit is closed and the alarm apparatus 27 actuated, the electromagnets 15 and 31, Figs. 6 and 1, being also excited and attracting the armatures 14 and 35, the spring driving mechanism becoming stationary and the objective 4 being closed by the falling of the shutter 22—that is, the exposure is interrupted. Hereupon by turning back the lever 18 the friction-disk 17 is put out of gear and the disk 17' put into gear by moving the lever 18' in the opposite direction, the disk 17' being now put into gear with the adjusting-ring 28 by displacing the carriage 2. If now by raising the lever 11 the spring driving mechanism is again set in motion and the closing-shutter 22 at the same time opened, the adjusting-ring 28 will be moved forward at the adjusted rate of speed uniformly until the spring 29 strikes against the pin 30'—that is to say, until the largest opening is attained, Fig. 9—whereupon, similarly as before, the actuating mechanism is stopped and the exposure interrupted. In connection herewith, according as the friction-rollers 16 16' are nearer to or farther from the circumference of the disks 17 17', the alteration of the cross-section of the opening is effected up to the indicated position in a longer or a shorter time. In consequence of the transmission by means of the connecting-gear the shaft 7' is driven at a greater speed than the shaft 7, for which reason the disk 17 has to effect the adjustment of the opening from the smallest to the medium point, while the complete opening must be effected with the disk 17'. By adjustable attachment or arrangement of a large number of contact-pins 30 it is possible to effect as often as desired the interruption of the exposure, the stopping of the actuating mechanism, and therewith also the adjustment of other rates of motion (which must be done by hand) until the complete opening is effected—that is to say, until the largest possible aperture is obtained in each instance.

The apparatus illustrated in Figs. 10 and 11 is so arranged that the introduction of the second rate of speed is effected automatically. In this case the actuating mechanism is held stationary in front of the lens-board and only one friction-disk 17 is employed, which remains in permanent engagement with the toothed rim of the adjusting-ring 28. The shafts 7 7', which hold the longitudinally-displaceable friction-rollers 16 16' in the manner already described, are pivoted on both sides of the disk 17, the shaft 7 being rotated slowly by the pair of bevel-wheels 6 8 and the shaft 7' more quickly by the pair of bevel-wheels 6' 8' and the spur-wheels 55 56. The wheels 8' and 55 rotate loosely on the shaft 7 and must move simultaneously.

In order that when the mean width of aperture is attained the disk 17, previously driven by the roller 16, may be actuated by the more rapidly rotating roller 16', the step-bearing opposite the spring 19, Fig. 11, is formed by a pin 58, which is adjustable in the bracket 57 and pressed against the pin of the friction-disk shaft by means of a powerful helical spring 59.

The tension-spring 60 is connected to the adjusting-lever 18 (the boss of which is provided with a cam) and has a tendency to pull the lever downward, and thereby to release the spring 19 and the disk 17, which, however, is prevented by the armature 61 of the electromagnet 62, Fig. 10. If the circuit running to the magnet be now closed by the striking of the contact-spring arranged on the adjusting-ring against a pin attached to the objective, the adjusting-lever will be deprived of support by the attraction of the armature 61 and pulled down by the spring 60, whereby the spring 19 is released and the more powerful helical spring 59, Fig. 11, pushes forward the previously-pressed-back pin 58, so that the disk 17, hereby pushed at the same time, moves away from the roller 16 and is pressed against the roller 16'—that is, the disk moved forward at the adjusted higher rate of speed. The connections with the points of contact must be so arranged in this form of the apparatus that the stopping of the actuating mechanism and the interruption of the exposure can only be effected after the aperture has been opened to the greatest extent.

What I claim, and desire to secure by Letters Patent, is—

1. An apparatus for mechanically adjusting the diaphragm-aperture in autotype screen photography comprising in combination a diaphragm-adjusting ring provided with gear-teeth, a pair of friction-disks also provided with gear-teeth and adapted to be geared with the diaphragm-adjusting ring, separate shafts driving the friction-disks, spring driving mechanism driving the shafts at different rates of speed, friction-wheels displaceably mounted on the shafts and engaging with the faces of the disks at radii corresponding to the rate of speed required, a carriage on which the friction-disks and their driving devices are mounted, a means for traversing the carriage and putting one or other of the friction-disks into gear with the toothed adjusting-ring, a contact-spring on the adjusting-ring adapted to close an electric circuit, a shutter actuated by the closing of the said electric circuit to interrupt the exposure, and means, also operated by the closing of the electric circuit, to effect the stoppage of the driving mechanism, substantially as described.

2. An apparatus for mechanically adjusting the diaphragm-aperture in autotype screen photography comprising in combination a diaphragm-adjusting ring provided with gear-teeth, a pair of friction-disks also provided with gear-teeth and adapted to be geared with the diaphragm-adjusting ring, separate shafts driving the friction-disks, spring driving mechanism driving the shafts at different rates of speed, escapement controlling the spring driving mechanism, a bent spring adapted to engage the escapement balance-wheel and thus stop the driving mechanism on the closing of an electric circuit, friction-wheels displaceably mounted on the driving-shafts and engaging with the faces of the friction-disks at radii corresponding to the rate of speed required, a carriage on which the friction-disks and their driving devices are mounted, a means for traversing the carriage and putting one or the other of the friction-disks into gear with the toothed adjusting-ring, a contact-spring on the adjusting-ring adapted to close an electric circuit, a shutter, a hooked lever normally engaging the shutter and holding it in a raised position, but withdrawn by the closing of the electric circuit to allow the shutter to fall into the closed position, substantially as described.

3. An apparatus for mechanically adjusting the diaphragm-aperture in autotype screen photography comprising in combination a diaphragm-adjusting ring provided with gear-teeth, a friction-disk also provided with gear-teeth and gearing with the diaphragm-adjusting ring, driving-shafts mounted on opposite sides of the friction-disks, spring driving mechanism driving the shafts at different rates of speed, friction-rollers mounted on the shafts, and means for moving the friction-disk into gear with one of the rollers, and electrically-controlled means for moving the disk out of gear with the said roller after a predetermined period and into gear with the other roller substantially as described.

In testimony whereof I affix my signature in presence of two witnesses.

ADOLF BRANDWEINER.

Witnesses:
HERM. LACK,
RUDOLPH FRICKE.